(No Model.)
W. J. WILKINSON.
ADJUSTABLE REFLECTOR HOLDER FOR STATIONARY LAMPS AND OTHER LIGHTS.
No. 324,627. Patented Aug. 18, 1885.
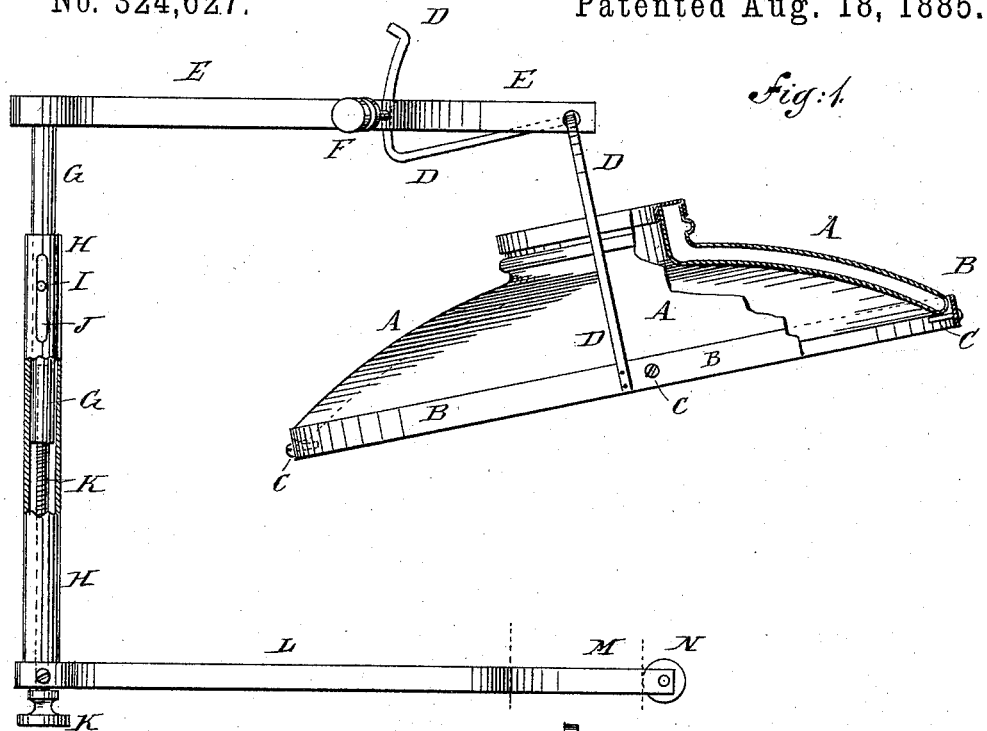
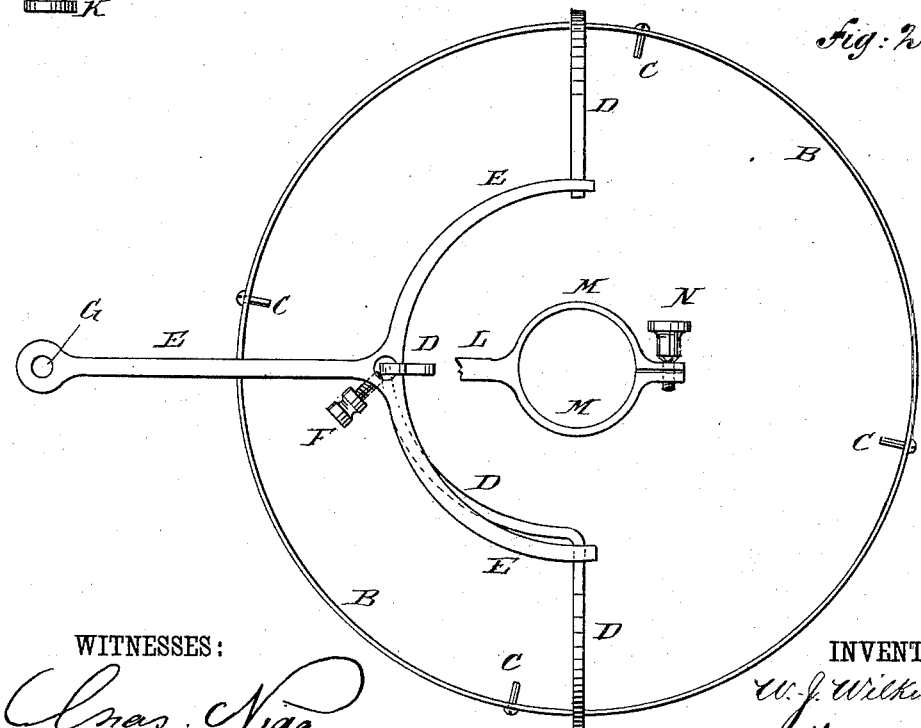
WITNESSES:
INVENTOR:
W. J. Wilkinson
BY Munn & Co
ATTORNEYS.

UNITED STATES PATENT OFFICE.

WILLIAM J. WILKINSON, OF PHILADELPHIA, PENNSYLVANIA.

ADJUSTABLE REFLECTOR-HOLDER FOR STATIONARY LAMPS AND OTHER LIGHTS.

SPECIFICATION forming part of Letters Patent No. 324,627, dated August 18, 1885.

Application filed July 1, 1885. (No model.)

*To all whom it may concern:*

Be it known that I, WILLIAM J. WILKINSON, of the city and county of Philadelphia, and State of Pennsylvania, have invented a new and useful Improvement in Adjustable Reflector-Holders for Stationary Lamps and other Lights, of which the following is a full, clear, and exact description.

Reference is to be had to the accompanying drawings, forming a part of this specification, in which similar letters of reference indicate corresponding parts in both the figures.

Figure 1 is a side elevation of one of my improved reflector-holders, parts being broken away. Fig. 2 is a plan view of the same, part being broken away.

The object of this invention is to provide adjustable reflector-holders for stationary lamps and other lights, constructed in such a manner that the reflector can be tilted to allow the chimney to be readily inserted and removed and to focus the light upon any desired spot.

The invention consists in the construction and combination of various parts of the reflector-holder, as will be hereinafter fully described, and then claimed.

A represents an ordinary reflector, the lower edge of which fits into the band B and rests upon pins C or other supports attached to or formed upon the said band. To the opposite sides of the band B are rigidly attached the lower ends of two arms, D, which curve upward and inward, and are journaled in bearings in the ends of the branches of the forked bar E. One of the arms D is curved rearward and inward to a point beneath the fork of the bar E, and is then bent upward and is curved forward in the arc of a circle having its center in the axis of the arms D, so that it can pass through and slide in a guide-hole in the fork of the bar E as the band B, and the reflector placed upon it, are swung forward and back, the journals of the arms D rocking in the bearings in the ends of the forked bar E. The reflector is locked in place, when adjusted, by a set-screw, F, placed in a screw-hole in the fork of the bar E, and resting against the curved part of the extended arm D.

The inner end of the forked bar E is rigidly attached to the upper end of a vertical rod, G, the lower part of which is placed and slides in a vertical socket, H, where it is kept from turning, and its vertical movement is limited by a pin, I, passing through a vertical slot, J, in the upper part of the socket H, and secured in a hole in the said rod G. The rod G is perforated longitudinally from its lower end, and has an interior screw-thread formed in it to receive the hand-screw K, which passes up through and is swiveled in the lower end of the socket H, so that the rod G and forked bar E, and with them the arms D, band B, and reflector A, can be raised and lowered by turning the swiveled hand-screw K.

When the holder is to be used with a bracket-lamp, the socket H is attached to or formed solid with the lamp-bracket; but when the holder is to be used with a stand-lamp the lower end of the socket H is secured to the rear end of the bar L, the forward end of which has an open spring-ring, M, formed upon or attached to it to fit upon the collar of the lamp. The ends of the open spring-ring M are bent outward, and are provided with a hand-screw, N, passing through a smooth hole in one end and screwing into a screw-hole in the other end, so that the open ring M and the hand-screw N will serve as a clamp for screwing the holder to the collar of a stand-lamp.

With this construction, by operating the hand-screw K the reflector can be raised or lowered to adjust it to the proper height, and by loosening the hand-screw F the reflector can be tilted to allow the lamp-chimney to be readily inserted or removed, or to throw or focus the light upon any desired spot.

Having thus fully described my invention, I claim as new and desire to secure by Letters Patent—

1. An adjustable reflector-holder for lamps and other lights, constructed substantially as herein shown and described, and consisting of the band B to receive the reflector, the bent pivotal arms D, the forked bar E, carrying the pivotal arms D, and provided with a set-screw, F, for securing the said arms in place, the sliding tubular rod G, attached to the forked bar E, and having interior screw-thread, the supporting-socket H, to receive the tubular rod G, and provided with a swiveled hand-screw, K, for adjusting the said tubular rod, whereby the reflector can be readily adjusted at any desired height and at any desired angle, as set forth.

2. The combination, with the socket H, the swiveled screw K, the tubular rod G, the forked bar E, secured to the rod G, the swinging arms D, journaled in the prongs of the fork, and the reflector-supporting band secured to the ends of the arms D, of the bar L, secured at one end to the socket H and provided at its opposite end with a clamp, substantially as set forth.

WILLIAM J. WILKINSON.

Witnesses:
ANNIE R. HOGG,
MARY E. WILKINSON.